Figure 1:
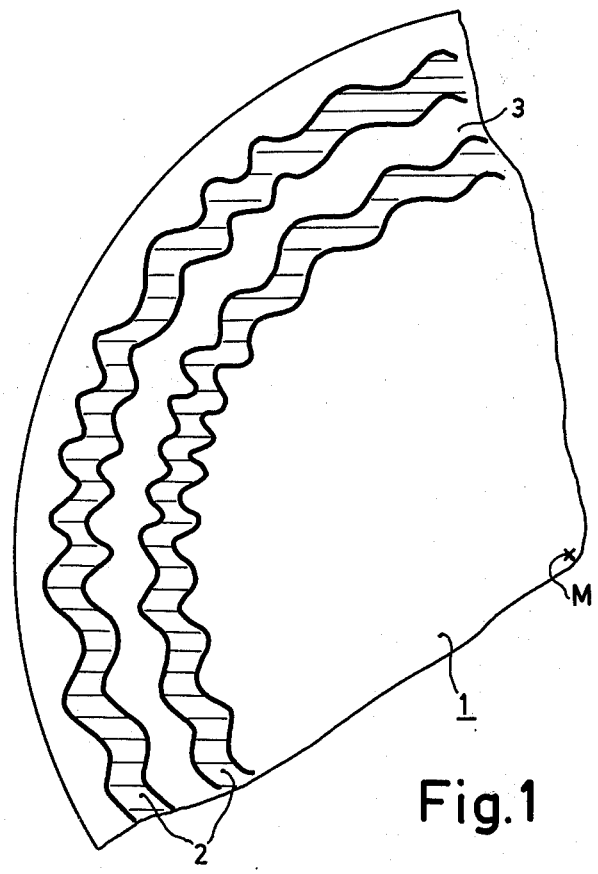

United States Patent [19]

Bouwhuis

[11] 3,963,862
[45] June 15, 1976

[54] RECORD CARRIER FOR A TELEVISION SIGNAL
[75] Inventor: Gijsbertus Bouwhuis, Eindhoven, Netherlands
[73] Assignee: U.S. Philips Corporation, New York, N.Y.
[22] Filed: Dec. 6, 1974
[21] Appl. No.: 530,164

[30] Foreign Application Priority Data
Sept. 25, 1974 Netherlands .................... 7412634

[52] U.S. Cl. .................... 178/6.6 R; 179/100.3 V; 358/4; 360/19
[51] Int. Cl.² ........................................ H04N 5/76
[58] Field of Search ................ 178/6.6 DD, 6.6 R; 358/4; 179/100.3 V

[56] References Cited
UNITED STATES PATENTS
1,916,973 7/1933 Friebus .................... 179/100.3 V
2,086,934 7/1937 Bonneau .................... 179/100.3 V

*Primary Examiner*—Robert L. Griffin
*Assistant Examiner*—Mitchell Saffian
*Attorney, Agent, or Firm*—Frank R. Trifari; Simon L. Cohen

[57] ABSTRACT

In a record carrier for the storage of a television signal in an optically readable track-shaped structure, the information is contained in the frequency and/or amplitude of an undulation of the tracks of constant track-width. Via a phase-reading mechanism an electric signal can be obtained which is substantially linear with the television signal to be written. When transferring a television signal via such a record carrier the electric signals need not be limited abruptly. As a result, no higher harmonics occur, and substantially no mixing products occur in the frequency band of the luminance information and in the frequency band(s) of other information, for example chrominance and sound information.

5 Claims, 15 Drawing Figures

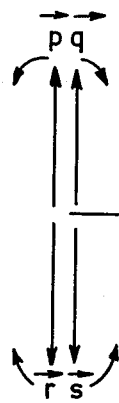
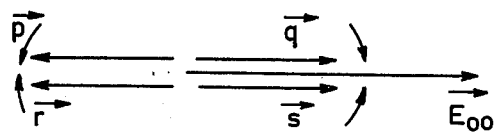
Fig. 6a    Fig. 6b
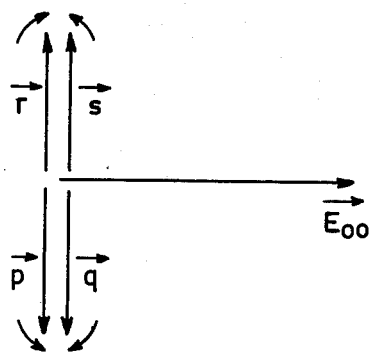
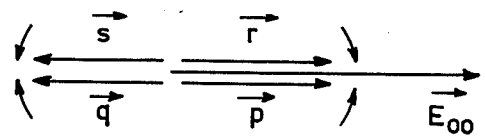
Fig. 6c    Fig. 6d
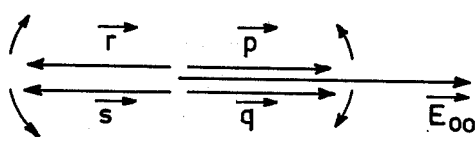
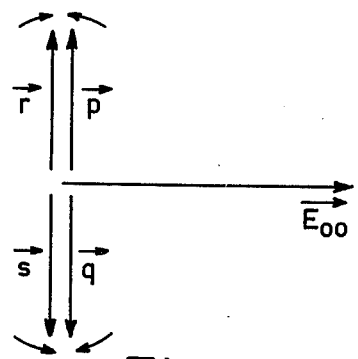
Fig. 7a    Fig. 7b

RECORD CARRIER FOR A TELEVISION SIGNAL

The invention relates to a record carrier on which a television signal is stored in tracks as an information structure of constant track width which is readable with optical radiation, which structure modulates the phase of a read beam of radiation, the television signal comprising a first carrier wave which is frequency modulated with the luminance information, and further carrier waves which are modulated with other information, for example chrominance and sound information. The invention also relates to an apparatus for reading such a record carrier.

In the case of a color television signal the "other" information is chrominance and sound information, which information sound may be modulated on one, two (stereo) or even four carrier waves. In the simplest case the television signal is a black-white signal and the sound is modulated on one carrier wave.

In "Philips' Technical Review" 33, No. 7, pages 181–185 a round disc-shaped record carrier is described, in which the luminance information and the chrominance and sound information are stored in one optically readable track in binary coded form. The track-shaped structure may consist of one spiral track which extends over a multitude of revolutions on the record carrier; it may alternatively consist of a multitude of concentric tracks. An information track comprises a multitude of pits which are pressed into the record carrier surface. The luminance information is contained in the spatial frequency of the pits, while the chrominance and sound information is recorded in the form of a modulation of the lengths of the pits (a so-called "duty cycle" modulation).

When writing on the record carrier described above a write beam of radiation is modulated in intensity by for example an electro-optic modulator to which a rectangular electrical signal in accordance with the information to be written is applied. When electronically composing said rectangular signal from the luminance information and the chrominance and sound information, limitations are necessary in the signal. This gives rise to mixing products of the first and the second carrier wave during reading. Such mixing products are undesirable. Should a mixing product occur within the frequency band covered by the modulated first carrier wave, said mixing product will give rise to interference, so-called moire, in the luminance signal which is read from the record carrier and reproduced. In a similar way, a mixing product of a frequency within the frequency bands which are occupied by the modulated further carrier waves results in interference in for example the chrominance signal which is read from the record carrier and reproduced. The nature of the mixing products and the extent of the disturbing effect of said products depends both on the photochemical process and signal processing circuits used during recording and on the choice of the carrier frequencies.

It is an object of the present invention to transmit a television signal by means of a record carrier, while minimizing the occurrence of mixing products of the luminance information and for example the chrominance and sound information. According to the invention use is no longer made of a binary coding, but care is taken that there is an optimum linear relationship between one or more parameters of the track-shaped structure and the information of the television signal. A record carrier according to the invention is characterized in that the tracks of the information structure are continuous tracks which exhibit an undulation in the plane of said structure, the variation of the undulation being determined by both the first and the further modulated carrier waves, that the undulation amplitude is substantially smaller than the period of the track structure in a direction transverse to the direction in which the tracks are read, and that the tracks cause a difference in optical pathlength in the read beam which is approximately an odd multiple of a quarter of the wavelength of the radiation to be used for reading.

An undulation is to be understood to mean an oscillation which consists of sinusoidal excursions whose frequency or amplitude varies over the record carrier.

It is to be noted that in British patent specification No. 1,133,480 it has already been proposed to provide a record carrier for sound with a wobbling groove, which groove is optically readable. As the wobble of the groove is only determined by the low-frequency sound information and not by a combination of high-frequency luminance information and chrominance and sound information of a lower frequency the wobble on the known record carrier is completely different from the undulation on the proposed record carrier. Furthermore, the groove is very deep relative to the wavelength of the read radiation and the depth of the groove may vary by some wavelengths without affecting the read process. For reading use is made of the fact that the polarization of the read radiation is modified by reflection at the groove walls. By an imaging system, which is disposed in the path of the radiation which is reflected at the record carrier, a black line is imaged on two radiation-sensitive detectors with the aid of polarizing means, the variation of which line corresponds to that of the groove. The phase properties of the information structure are not utilized as in the record carrier according to the invention.

An apparatus for reading a record carrier according to the invention, which apparatus comprises a radiation source and an objective system for applying radiation from the radiation source via the record carrier to a radiation sensitive information-detection system, which system converts the radiation which is supplied by the radiation source and modulated by the information structure into an electrical signal, is characterized in that the information detection system consists of two radiation-sensitive detectors which are disposed in the effective exit pupil of the objective system, the separating line of the detectors, when projected on the plane of the information structure, being parallel to the direction in which the tracks are read, and that the outputs of the detectors are connected to a differential amplifier at whose output the information signal is available.

The "effective" exit pupil of the objective system is to be understood to mean the actual exit pupil of said system if said pupil is readily accessible. The effective exit pupil may also be constituted by an image of the actual pupil if said actual pupil is substantially inaccessible.

It is to be noted that in the German patent application No. 2,342,906 which has been laid open for public inspection, an apparatus is proposed for reading an optical information structure, in which two detectors are used which occupy the same position in the direction of reading and different positions in a direction transverse thereto. In the known apparatus, however, the two detectors are employed for detecting whether the read beam is correctly centered relative to the track to be read, and not for reading the information stored. The high frequency information signal is obtained in the known apparatus by addition of the output signals of the two detectors. In said patent application another read apparatus is described, in which apparatus the high-frequency information signal is derived from the difference of the output signals of two detectors. However, the two detectors are then offset relative to each other in the direction of reading and not in a direction transverse thereto as in the proposed apparatus. As will be explained hereinafter the position of the detectors and the manner in which the detector signals are combined are determined by the manner in which the information structure is composed. From this it will become evident that the apparatus according to the said German patent application employs a different read mechanism than the proposed read apparatus.

Figure 2:
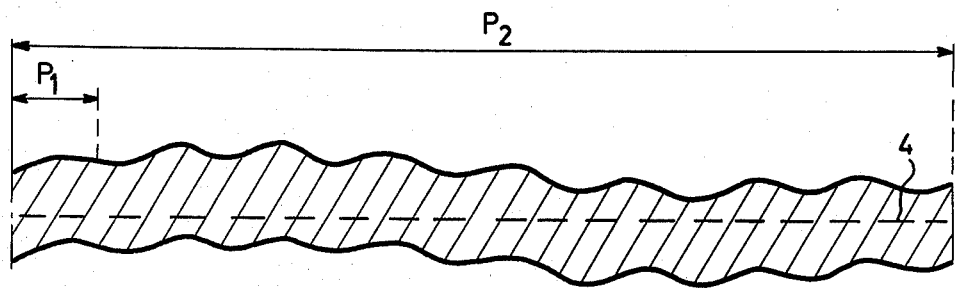
Figure 3:
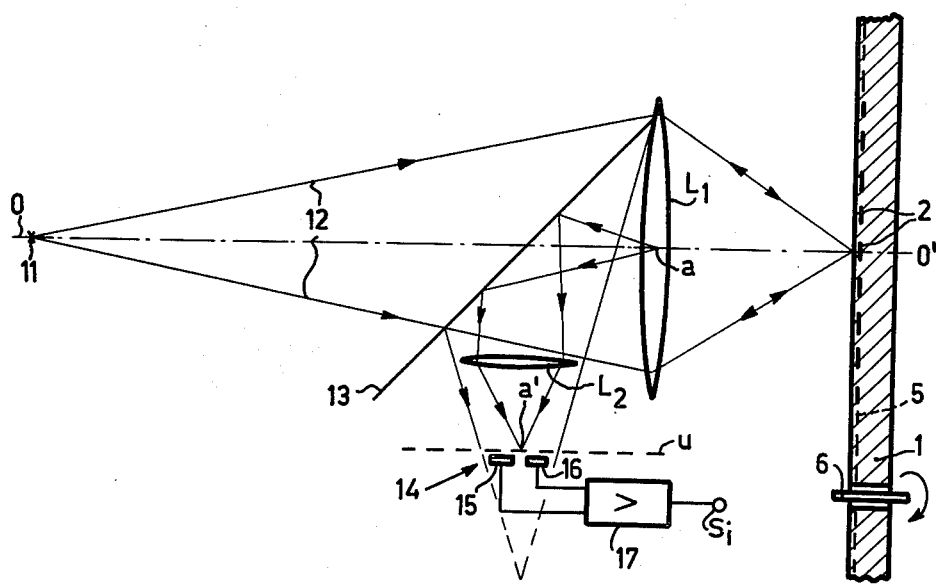
Figure 8:
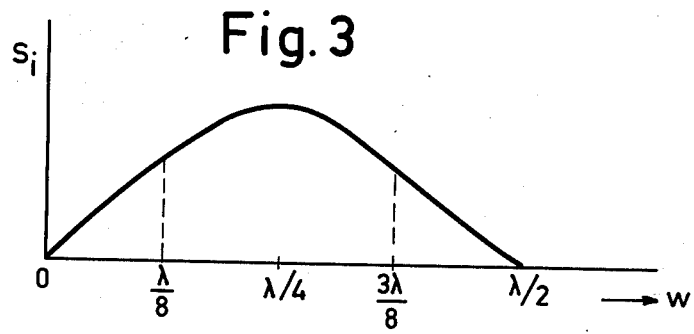
Figure 9:
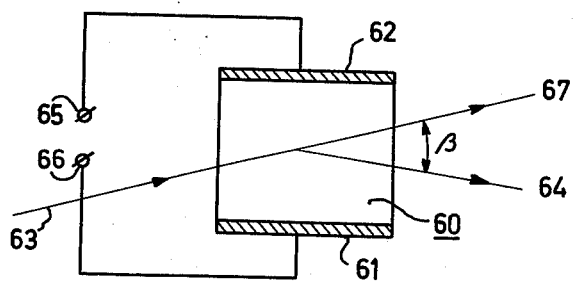

The invention will now be described with reference to the drawing, in which:

FIG. 1 shows a part of a round disc-shaped record carrier which is provided with an information structure according to the invention, FIG. 2 shows a part of a track of the information structure, FIG. 3 shows an embodiment of an apparatus for reading a record carrier according to the invention, FIGS. 4a, 4b, 5a, 5b, 6a, 6b, 6c, 6d, 7a and 7b clarify the mechanism of reading, FIG. 8 represents the amplitude of the detected signal as a function of the difference in optical pathlength caused by the information tracks, and FIG. 9 shows an acousto-optic modulator for use in an apparatus for writing an information structure according to the invention.

FIG. 1 shows a part of a round disc-shaped record carrier 1, on which a television signal is stored. The record carrier is provided with a multitude of concentric or quasi-concentric tracks 2 alternating with lands 3. According to the invention the tracks undulate around an average position, the full information of the television signal, for example a color television signal, being contained in the undulation of the tracks. As can be seen in FIG. 2, which shows a small portion a single track, the undulation of a track varies in accordance with two modulated carrier waves. The dotted line 4 represents the average position of the track center. The track exhibits a first undulation with a short, variable period $p_1$ and a second undulation with a longer period $p_2$ which is also variable. The spatial frequency of the first undulation is determined by the carrier wave which is modulated by the luminance information of the color television signal, while the frequency of the second undulation is determined by a carrier wave which is modulated with the chrominance and sound information.

When the amplitude of the undulation on the record carrier is kept small relative to the track width (said amplitude is for example 1/10 of the track width) the detected electrical signal is approximately linear relative to the signal to be written. In the entire system, from the formation of the electrical drive signal for the optical modulator to the decoding of the detected electrical signal, no abrupt limitations occur. Substantially no higher harmonics are produced, so that substantially no mixing products occur in the frequency bands of the luminance information and of the chrominance and sound information.

As is shown in FIG. 2 both the luminance information and the chrominance and sound information may be laid down in the spatial frequency of the undulation of the track. However, it is also possible to define said luminance information and chrominance and sound information in an amplitude modulation of an undulation with a constant period. Furthermore, it is possible to modulate the undulation of the track both in amplitude and in frequency, the luminance information then being for example contained in the spatial frequency of the undulation and the chrominance and sound information in the amplitude of the undulation.

The information structure is a phase structure, which means that it modifies the phase of a read beam. The information tracks are for example disposed at a different height in the record carrier than the intermediate lands. The record carrier may be radiation reflecting or radiation transmitting. In either case the distance between the plane of the tracks and that of the lands must be such that radiation which has passed through a track or is reflected at a track covers an optical pathlength which is approx. $(2n+1)\, \lambda/4$ shorter or longer than the optical pathlength which is covered by radiation which has passed through or is reflected at a land. In this context the optical pathlength is the product of the actual pathlength and the refractive index of the medium in which said path is located. $\lambda$ is the wavelength of the radiation used for reading and $n = 0, 1, 2$ etc. For example, for a record carrier with a reflecting information structure which adjoins air, the distance between the plane of the tracks and that of the lands should be approximately $(2n+1)\,\lambda/8$.

FIG. 3 shows an apparatus according to the invention for reading a reflecting record carrier. A radiation source 11, for example a laser, emits a read beam of radiation 12. Said beam is focussed onto the information plane 5 of the record carrier 1 by an objective system, which in this case is schematically represented by a single lens $L_1$. The record carrier is shown in radial cross-section. The tracks are again denoted by 2. The beam which is reflected by the record carrier and modulated by the information structure passes the objective $L_1$ for a second time, and is subsequently reflected to a radiation-sensitive detection system 14 by for example a semi-transparent mirror 13.

According to the invention said detection system is disposed in the plane of the effective exit pupil of the objective system $L_1$. Said effective exit pupil is an image of the actual exit pupil of the objective system, which image is formed by an auxiliary lens $L_2$. For simplicity only the image $a'$ of one point $a$ of the exit pupil is shown in the Figure. If the actual exit pupil of the objective system is suitably accessible it is obvious that imaging is not necessary.

The radiation-sensitive detection system 14 consists of two separate detectors 15 and 16. Said detectors are disposed so that, when projected on the record carrier, they occupy different positions viewed radially. The electrical signals supplied by the detectors 15 and 16 are applied to a differential amplifier 17. When the record carrier is rotated about an axis 6 and when the read system and the record carrier are radially moved relative to each other a signal $S_i$ is obtained at the output of said amplifier. The information contained in said signal may further be rendered visible and audible in known manner.

The system for transmitting a television signal according to the invention differs from known systems in that the information is stored on the record carrier in a direction transverse to the direction in which the tracks are read and that during reading the record carrier is scanned in the same transverse direction. The principle of the invention will now be explained with reference to FIGS. 4a, 4b, 5a, 5b, 6a, 6b, 6c and 6d.

Figure 4A:
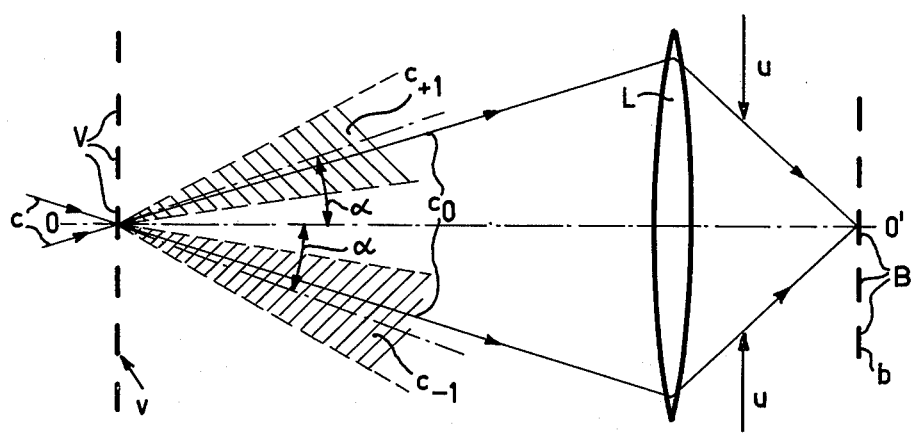

A lens L, which exhibits no aberrations, can form a faithful image B in the image plane b of an object V which is located in the object plane v (cf. FIG. 4a). All information on the object is present in an arbitrary plane through the optical axis OO' and perpendicular to said axis. However, in the plane u of the exit pupil of the lens L certain information can be detected which in practice can generally no longer be observed separated from other information in the image plane.

Figure 4B:
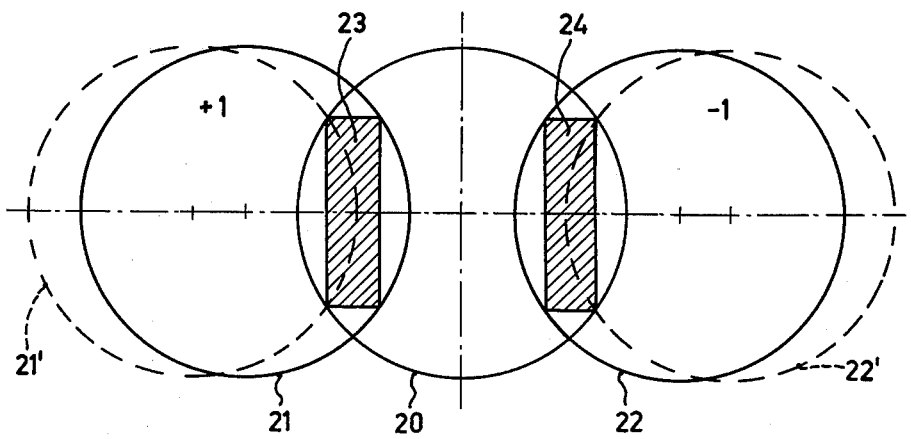

If the object is a grating, a radiation beam c is divided by the grating into a zero-order beam $c_0$, two first-order beams $c_{+1}$ and $c_{-1}$ and a number of higher-order beams, not shown. The zero-order beam then contains no information about the object; said information is divided over the beams of other orders. Provided that the lens pupil is sufficiently large all orders together yield a faithful image of the grating in the image plane. In said image plane the individual orders cannot be distinguished. However, in the plane of the exit pupil the orders are more or less separate. FIG. 4b shows the situation in said plane. The circle 20 represents the exit pupil, while the circles 21 and 22 represent cross-sections at the location of the exit pupil of the +1 order and the −1 order beam respectively. The positions of the circles 21 and 22 in the plane of the exit pupil are determined by the period of the grating. The angle $\alpha$ between the chief rays of the first-order beams and the chief ray of the zero-order beam is given by $\alpha = \lambda/p$, $p$ being the period of the grating and $\lambda$ the wavelength of the radiation of the beam c. At decreasing grating period the diffraction angle $\alpha$ increases (compare the dotted circles 21' and 22'). At increasing grating period the overlap of the +1 and −1 order beams increases. By arranging a separate detector (23 and 24 in FIG. 4b) in the left and the right pupil half, the +1 and the −1 order beams can be detected separately.

So far, it has been assumed that the grating lines are straight lines and that the grating is stationary. In the information structure of a record carrier according to the invention the tracks exhibit an undulation, and said structure moves relative to the optical read system.

Figure 5A:
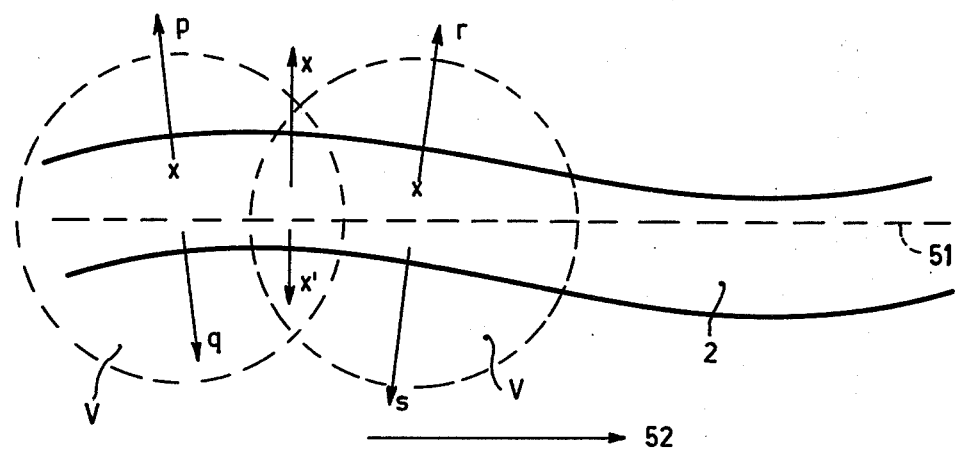

FIG. 5a shows a small portion of a track 2 of the information structure. The track is illuminated by a read spot of radiation V. During reading the read spot and the information track move relative to each other in the direction of the arrow 52. A tracking control system ensures that the read spot V and the exit pupil of the objective are always substantially centered at the dotted line 51. Said dotted line represents the average position of the track center taken over a great distance. Owing to the undulation of the track the radiation is diffracted in inter alia the directions denoted by the arrows p, q, r and s. The beams diffracted in these directions are of significance in reading the information structure.

Figure 5B:
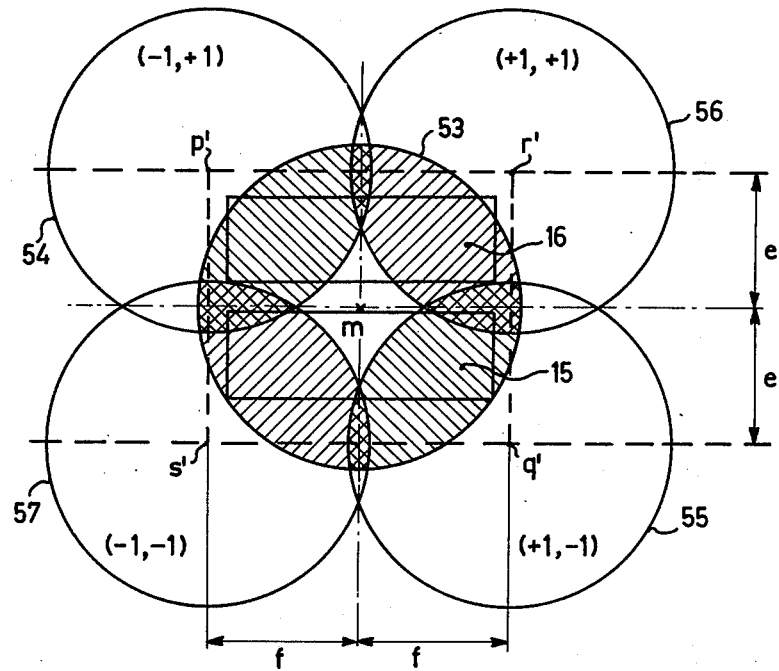

In the plane of the exit pupil the situation of FIG. 5b occurs. The central circle 53 represents the size of the exit pupil. The cross-sections of the beams of the (−1,+1), (+1,−1), (+1,+1) and (−1,−1) orders at the location of the exit pupil, which beams are diffracted in the directions p, q, r, and s of FIG. 5a, are represented by the circles 54, 55, 56 and 57. Said circles, with the centers p', q', r' and s', have the same radius as the circle 53. The distance e in FIG. 5b is determined by $\lambda/p_r$, in which $p_r$ is the period of the information structure in a direction transverse to the direction of reading. Said period may be assumed to be constant. The distance f is a function of $\lambda/p_t$, in which $p_t$ is the period of the information structure in the direction of reading. In the case that the television signal is contained in a modulation of the spatial frequency of the undulaton of a track, $p_t$ will vary during reading of the information structure.

FIGS. 6a, 6b, 6c and 6d show the variation of the phases of the various first-order beams relative to the zero-order beam. The electric field vector $\overline{E_{00}}$ of the zero-order beam, as well as those of the first-order beams rotate with the velocity of light. For a specific point in a track the (−1,+1) order beam has a phase vector $\overline{p}$ which makes a certain angle with the vector $\overline{E_{00}}$. The (+1,−1) order beam has a phase vector $\overline{q}$ under the same angle with the vector $\overline{E_{00}}$ as the phase vector $\overline{p}$. If the information track moves relative to the read spot, as is shown in FIG. 5a, the phase angle of the order which is diffracted to the right will increase and that of the order which is diffracted to the left will decrease. When the information track and the read spot V move relative to each other the vectors $\overline{p}$ and $\overline{q}$ consequently rotate in opposite directions. The vector $\overline{r}$ and $\overline{s}$ correspond to the (+1,+1) and (−1,−1)-order beams. These vectors also rotate in opposite directions during reading of the information structure.

Starting from the initial situation of FIG. 6a, the situation of FIG. 6b will occur after the read spot has moved over a distance which equals ¼ of the local tangential period in the direction of reading. FIG. 6c represents the situation after the read spot has moved over a distance equal to ½ of the local tangential period in the direction of reading, and FIG. 6d the situation after a distance is covered which equals ¾ of the local tangential period. After a movement of the read spot over a distance equal to a full local tangential period the situation of FIG. 6a is obtained again.

The component of the sum of the vectors $\overline{p}$ and $\overline{r}$ in the direction of the vector $\overline{E_{00}}$ decreases from 0 (FIG. 6a) to a minimum value (FIG. 6b), then becomes zero again (FIG. 6c) and subsequently becomes maximum (FIG. 6d). For the component of the sum of the vector $\overline{q}$ and $\overline{s}$ the variation in the reverse, namely from 0 to a maximum (FIG. 6b), then to 0 again (FIG. 6c) and subsequently to a minimum (FIG. 6d).

In the areas which are shown hatched in FIG. 5b, where the first-order beams and the zero-order beam overlap, there is alternately constructive and destructive interference between the zero-order beam and the relevant first-order beam, so that the intensities in said areas increase and decrease alternately. The intensity variations, which are determined by the variation of the undulation and thus by the information which is tored, can be detected with the radiation-sensitive detectors 15 and 16 (FIG. 5b). The intensity variations which are the result of the diffraction in the directions p and r are mutually in phase and are in phase opposition with the intensity variations as a result of the diffraction in the directions q and s, said last-mentioned variations also being mutually in phase. By subtracting the output signals of the detectors 15 and 16, as is effected in the apparatus according to the invention (compare FIGS. 3 and 5b), an electric signal is obtained having an amplitude which is twice the amplitude of the signal supplied by the individual detectors.

As stated previously, the positions of the centers $p'$, $q'$, $r'$ and $s'$ of the circles 54, 55, 56 and 57 of FIG. 5b are determined by the period in the tangential direction $p_t$. At increasing spatial frequency of the information on the record carrier, in other words at decreasing local periods of the undulation, the centers $p'$, $q'$, $r'$ and $s'$ will move outwards relative to the central circle 53, so that the overlapping areas, shown hatched, of the circles 54, 55, 56 and 57 with the circle 53 become smaller. The extent to which the first-order beams interfere with the zero-order beam then decreases. This means that the magnitude of the signals supplied by the detectors 15 and 16 decreases at higher spatial frequencies of the information on the record carrier.

The electric signal supplied by each of the detectors 15 and 16 varies in time in accordance with the variation of the undulation of the tracks on the record carrier. In the case described above in which the information is contained in the variable period of the undulation the electric signal has a constant amplitude and a varying frequency. The information may also be contained in an amplitude modulation of the undulation. In that case the period $p_r$ may no longer be considered a constant and the centers $p'$, $q'$, $r'$ and $s'$ in FIG. 5b will then alternately move up and down during reading of the record carrier. In terms of the vector diagrams of FIGS. 6a, 6b, 6c and 6d this means that the lengths of the vectors vary with the information stored, while the velocity with which the vectors rotate relative to the vector $\overline{E_{00}}$ is constant. The electric signal from the detectors 15 and 16 then has a constant frequency and a varying amplitude.

In FIGS. 6a, 6b, 6c and 6d it has been assumed that the tracks of the information structure cause a difference in optical pathlength of $\lambda$ 4 in the read beam, so that in the initial position (FIG. 6a) the angle between the vectors $\overline{p}$, $\overline{q}$, $\overline{r}$ and $\overline{s}$ and the vector $\overline{E_{00}}$ is $\pi/4$. For the method of reading according to the invention such a track structure is most ideal; the detected signal is then maximum. However, said difference in optical pathlength may vary over a fairly wide range around the value $\lambda/4$ without the amplitude of the detected signal becoming too small. FIG. 8 represents the amplitude of the detected signal $S_i$ as a function of the difference $w$ in optical pathlength caused by the tracks. From this it appears that a satisfactory reading of information is possible for pathlength differences ranging between $\lambda/8$ and $3 \lambda/8$. However, the method of reading according to the invention cannot be employed for record carriers whose tracks cause a difference in optical pathlength in the read beam which approximates 0 or $\lambda/2$.

FIGS. 7a and 7b show two phase vector diagrams which apply to the last-mentioned case. FIG. 7a shows the initial position which corresponds to FIG. 6a, while FIG. 7b shows the situation after the read spot has moved over a distance equal to ¼ of the local undulation period over the track to be read. In practice the sum of the vectors $\overline{E_{00}}$, $\overline{p}$ and $\overline{r}$ will not vary substantially and variation takes place with a frequency which is twice the frequency which corresponds to the spatial frequency of the information on the record carrier. The detectors 15 and 16 then supply a distorted electric signal of a small amplitude.

The situation shown in FIG. 5b only applies to a radiation transmitting record carrier. When a radiation-reflecting record carrier is to be read, only the hatched parts of the first-order circles are transmited by the objective.

When describing the read mechanism only first-order beams have been mentioned. It is evident that the track structure will also diffract radiation of higher order. However, the radiation energy of the higher diffraction orders is fairly low, and the diffraction angles are such that only a small portion of the higher order beams falls inside the lens pupil. The higher order beams may therefore be neglected for the described method of reading.

Furthermore, in describing the method of reading only diffraction in the directions $p$, $q$, $r$, and $s$ was presumed. By means of calculations, based on the theory of diffraction at phase grating, it can be demonstrated that the diffraction in the direction of reading and the diffraction in the direction transverse to the direction of reading have no influence on the high-frequency signal supplied by the detectors 15 and 16. It will be readily conceivable that no diffraction occurs in the direction of reading when it is borne in mind that the track is a continuous track.

The beams of the $(0,-1)$ and $(0,+1)$ orders which are diffracted in directions $x$ and $x'$ perpendicular to the dotted line 51 in FIG. 5b do not contain any high-frequency television information. The radiation energy in said beams is low relative to that of the $(0,0)$ order beam and the angle between the phase vectors of said beams and the phase vector $\overline{E_{00}}$ is 90°. Interference of the $(0,-1)$ and $(0,+1)$ order beams with the $(0,0)$ order beam hardly causes the intensity of said last-mentioned beam to change. The influence of the beams which are diffracted in a direction transverse to the direction of reading on the signals from the detectors 15 and 16 is therefore negligible.

During reading of the record carrier the read spot should remain centered at the average position of the track center. For the detection of errors in the centering of the read spot the high-frequency undulation of the tracks, which is determined by the television signal, can be modulated with an additional undulation of constant period, which period is some orders of magnitude longer than the average period of the high-frequency undulation. The additional undulation impresses an additional modulation on the detector signals, whose phase is a measure of the centering of the read spot relative to the average position of the track center. From the electric signals supplied by the detectors a low-frequency component may be extracted for correcting the centering of the read spot in known manner. The use of an undulating track for centering purposes has already been proposed in U.S. patent application Ser. No. 442,396, filed Feb. 14, 1974.

It is also possible to control the centering of the read spot without an additional undulation. For this use is made of the fact that centering errors will always have a low frequency relative to the undulation of a track which is determined by the television signal. In a manner 2,342,906, to that described in the German patent application 2,343,906, which has been laid open for public inspection, a control signal for correcting the position of the read spot relative to a track to be read can be obtained by extracting a low-frequency component from the electric signals supplied by the detectors.

An information structure according to the invention may be written in a record carrier body by means of a previously proposed apparatus disclosed in the above mentioned U.S. patent application. In said apparatus a direction modulator, for example an acousto-optic cell, is disposed in the path of a radiation source, which supplies a write beam of radiation to the radiation-sensitive surface of the record carrier body. Such a cell is shown in FIG. 9.

The cell 60 is provided with two electromechanical transducers 61 and 62, which are connected to the electrical terminals 65 and 66. When an electrical signal is applied to terminals 65 and 66 acoustic waves of a certain frequency are produced in the cell medium, for example glass or water. This results in so-called Bragg diffractions in the cell medium, so that a radiation beam 63 is partly diffracted through an angle $\beta$ as a sub-beam 64. The magnitude of the angle $\beta$ is proportional to the frequency of the electric signal applied to terminals 65 and 66. The angle through which the radiation beam is to be diffracted during writing of a record carrier according to the invention is only small. Therefore, the acousto-optic cell may be driven with high frequencies. For example a basic signal may be applied to the cell with a frequency of the order of magnitude of 100 MHz, which basic signal is modulated with a television signal whose frequency is of the order of 5–10 MHz.

What is claimed is:

1. A record carrier of the type on which a television signal is stored in tracks in the form of a radiation modulating information structure of constant track width recorded along an average track path, which structure modulates the phase of a read beam of radiation, the stored television signal comprising a first carrier wave which is frequency modulated with the luminance information, and further carrier waves which are modulated with additional information, the improvement wherein the tracks of the information structure are continuous tracks which in the plane of said structure exhibit undulation transverse to the average track path, the amplitude, frequency and phase characteristics of said undulation being determined by both the first and the additional modulated carrier waves, the undulation amplitude being substantially smaller than the period of the track structure in a direction transverse to the average track path, the tracks comprising a means for providing a difference in optical pathlength in the read beam which is approximately equal to an odd multiple of a quarter of the wavelength of the read beam of radiation.

2. A record carrier as claimed in claim 1, wherein the carrier wave which is modulated with the luminance information determines the spatial frequency of the undulation of the tracks, the additional information determining the amplitude of the undulation.

3. A record carrier as claimed in claim 1, wherein the first undulation which is the recorded television signal is amplitude modulated with a further signal as a second undulation of the tracks, which second undulation has a spatial frequency which is an order of magnitude smaller than the lowest spatial frequency of the recorded television signal which is present on the record carrier.

4. A record carrier as claimed in claim 1, wherein at least one surface of the record carrier body exhibits periodic excursions, which excursions are variable in the direction in which the tracks are read, and of which excursions the spatial frequency is some orders of magnitude smaller than the average spatial frequency of the undulation in the tracks which is determined by the television signal.

5. An apparatus for reading a record carrier on which a television signal is stored in continuous tracks in the form of radiation modulating radial undulations of constant track width recorded along an average track path which structure is capable of modulating the phase of radiation, comprising a radiation source which supplies a read beam of radiation, an objective system for transferring radiation from the radiation source via the record carrier to a radiation-sensitive detection system, which converts the read beam which is modulated by the information structure into an electric signal, wherein the information detection system comprises two adjacent radiation-sensitive detectors which are disposed in the effective exit pupil of the objective system and provide electrical signals, an imaginary separating line intermediate the detectors, if projected on the plane of the information structure, being parallel to the average track path of the record portion being scanned by said read beam of radiation, and a differential amplifier at whose output the information signal is available having input terminals connected to the electrical signals from the detectors.

* * * * *

UNITED STATES PATENT AND TRADEMARK OFFICE
CERTIFICATE OF CORRECTION

PATENT NO. : 3,963,862
DATED : June 15, 1976
INVENTOR(S) : GIJSBERTUS BOUWHUIS

It is certified that error appears in the above-identified patent and that said Letters Patent are hereby corrected as shown below:

Col. 2, line 41, "applying" should be --supplying--;

Col. 6, line 47, "vector" should be --vectors--;

Col. 8, line 60, after "ner" cancel "2342906," and insert --similar--;

line 61, "2343906" should be --2342906--;

Signed and Sealed this

Twenty-third Day of November 1976

[SEAL]

Attest:

RUTH C. MASON
Attesting Officer

C. MARSHALL DANN
Commissioner of Patents and Trademarks